United States Patent [19]
Simpson

[11] 3,935,658
[45] Feb. 3, 1976

[54] ILLUMINATED BLADDER BUOY
[75] Inventor: Kenneth Simpson, Cordova, Alaska
[73] Assignee: The Raymond Lee Organization, Inc., New York, N.Y. ; a part interest
[22] Filed: Jan. 15, 1974
[21] Appl. No.: 433,598

Related U.S. Application Data
[63] Continuation of Ser. No. 302,028, Oct. 30, 1972, abandoned.

[52] U.S. Cl. ................ 43/17.5; 9/8.3 E; 240/6.4 F
[51] Int. Cl.² .................... A01K 93/00; B63B 21/00
[58] Field of Search............... 9/8, 8.3 E, 9; 43/17.5; 240/6.4 F

[56] References Cited
UNITED STATES PATENTS

| | | | |
|---|---|---|---|
| 2,619,303 | 11/1952 | Martin | 9/9 X |
| 3,041,771 | 7/1962 | Hreno | 43/17 X |
| 3,374,494 | 3/1968 | Hunley | 9/8 |
| 3,425,390 | 2/1969 | Salmi | 9/9 X |

Primary Examiner—Trygve M. Blix
Assistant Examiner—Gregory W. O'Connor
Attorney, Agent, or Firm—Howard I. Podell

[57] ABSTRACT

A bladder buoy, suitable for the supporting of fishing nets, trap lines and other fishing gear, the surface of which is illuminated by an internal battery operated light. The body of the buoy is fabricated of a translucent semi-opaque material which becomes illuminated by the passage of light from the inside of the buoy, making it possible for passing boatsmen, at night to recognize the shape of the illuminated buoy, as well as to observe any opaque markings on the body of the buoy.

2 Claims, 1 Drawing Figure

ILLUMINATED BLADDER BUOY

This application is a continuation of application No. 302,028, filed Oct. 30, 1972, for Illuminated Bladder Buoy by the same applicant which application, now abandoned.

SUMMARY OF THE INVENTION:

This invention relates to a bladder buoy which serves to support fishing gear such as nets and trap lines, and particularly a buoy which is formed of an inflated translucent or semi-opaque membrane which becomes illuminated from an internal battery powered flashlight source.

An advantage of this device is that the entire surface of the buoy is illuminated at night, making it possible for boatsmen to observe the shape of the buoy, as well as any opaque buoy markings.

The inflated buoy is formed with an attached tab, in which a hole is located, for fastening to fishing gear which the buoy is to support. The electric light unit is mounted inside of the buoy, being fastened through a hole in the outer circumference of the buoy so that the batteries of the light unit may be replaced without deflating the buoy. The switch member is enclosed in a flexible waterproof cap that protrudes beyond the buoy.

In an alternate embodiment, the light unit is controlled by clockwork or light sensitive means so that the buoy is illuminated only during the night, as a means of conserving the batteries of the unit.

BRIEF DESCRIPTION OF THE DRAWING

The objects and features of the invention may be understood with reference to the following detailed description of an illustrative embodiment of the invention, taken together with the accompanying drawing which is an elevation with a partial crosssection of the bladder buoy of the invention.

Figure 1:
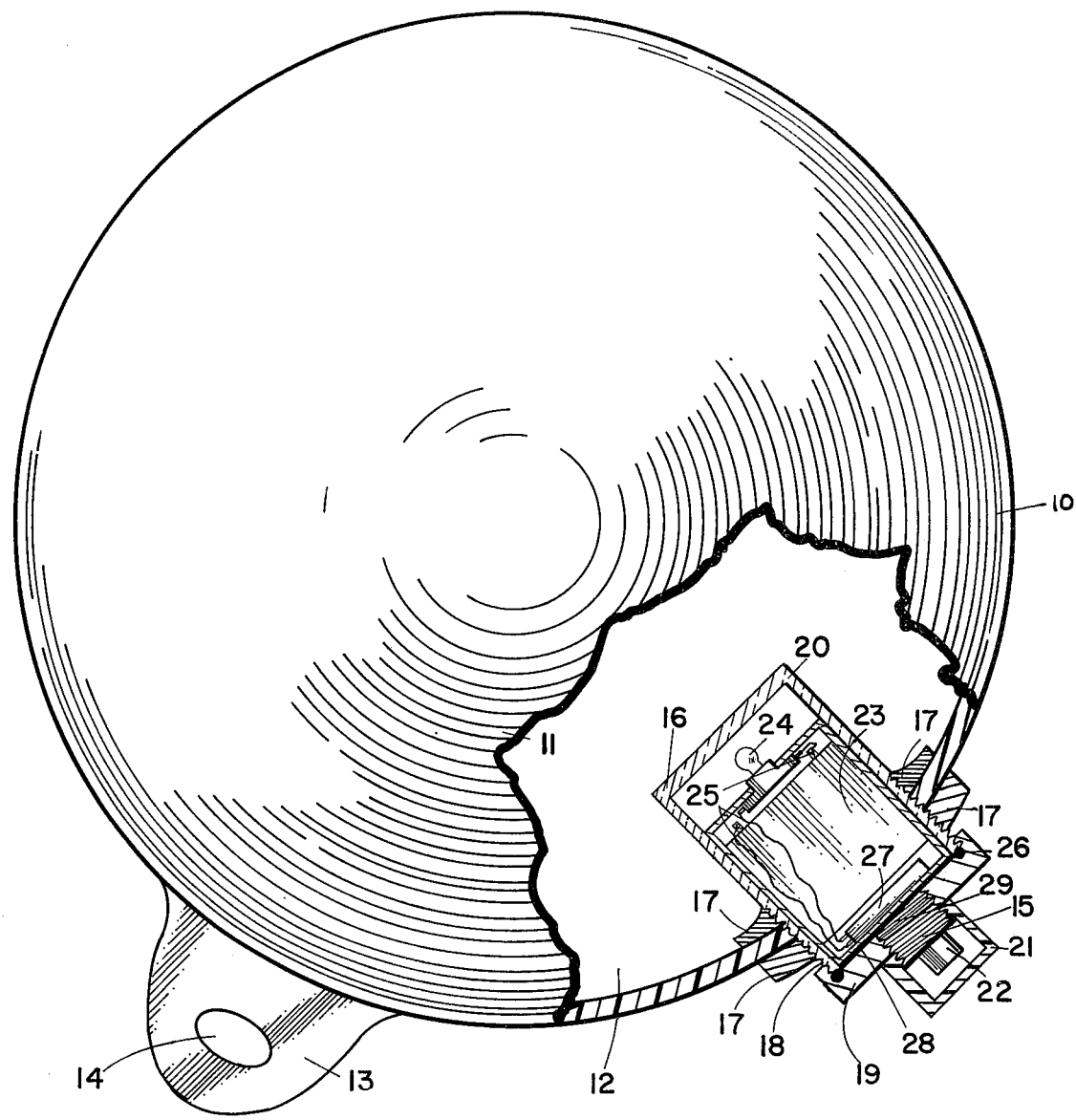

DESCRIPTION OF THE PREFERRED EMBODIMENT:

Turning now descriptively to the drawing, the buoy 10 is formed of a thin translucent or semi-opaque membrane 11 maintained in a spherical shape by internal inflation of air 12. A tab 13, extends from the buoy 10, with an anchoring hole 14 located in the tab 13 for attachment to an anchoring line or to the fishing gear which the buoy 10 is designed to support.

The light unit 20 is installed through a hole in the membrane 11, with a cylindrical shell 16 fastened to the membrane 11 in a waterproof fitting by threaded washers 17. The external cylindrical shell 16 is formed with a male screw thread 18, and threaded washers 17 tighten about the membrane 11 in engagement with the screw thread 18 to provide a watertight fit. Shell 16 is preferably formed of a transparent plastic material to permit the passage of light from bulb 24 to the interior of the buoy 10.

Cover plate 19 of the shell 16 is also fitted with a female thread to engage the male screw thread 18 of the shell 16, and tightens about O ring 26 to provide a watertight seal of the contents of light unit 20.

The light unit 20 houses flashlight bulb 24 connected by wires 25 to battery 23. Battery 23 is in series with switch 27 which is fastened by means of male screw thread 29 on switch collar 15 to the cover plate 19. O Ring 28 between the switch 12 and the cover plate 19 maintains a waterproof seal of the shell contents, and the switch operator button 22 is enclosed by a flexible plastic cap 21 which also threads about the switch collar 15 to maintain a waterproof seal between the switch 27 and switch button 22.

In operation, flashlight bulb 24 is turned ON when the buoy 10 is used at night, with the internal light source causing the translucent membrane 11 to become illuminated. Opaque markings may be located on the internal or external surface of membrane 11.

Since obvious changes may be made in the specific embodiment of the invention described herein, it is indicated that all matter contained herein is intended as illustrative and not as limiting in scope.

Having thus described my invention, what I claim as new and desire to secure by letters patent of the United States is:

1. A bladder buoy suitable for the supporting of fish nets, trap lines and other fishing gear, the outer membrane of which is illuminated by means of a battery-powered flashlight located inside the buoy, cosisting of
    an inflated translucent or semi-opaque membrane in the shape of a sphere with positive flotation characteristics, inside of which, in a transparent housing, is mounted a battery and flashlight bulb,
    said housing enclosing the flashlight and battery being sealed from the interior inflated recess of the buoy,
    with the housing supporting the flashlight bulb and battery mounted inside the buoy and extending externally of the buoy surface, with means mounted in the external part of said housing for removing and replacing the bulb and the battery, said means providing a waterproof seal of the flashlight housing unit when the housing is closed, with the housing unit serving to seal the interior of the balloon when the housing is closed, or open for replacement of a bulb or battery.

2. The combination as recited in claim 1 together with a tab mounted externally to the membrane of the buoy at a distance from the housing, which tab is pierced with a through hole for fastening to a line.

* * * * *